(12) United States Patent
Gusek et al.

(10) Patent No.: US 8,985,902 B2
(45) Date of Patent: Mar. 24, 2015

(54) SYSTEM AND METHOD FOR TREATING AN EXCAVATION ACTIVITY

(75) Inventors: James J. Gusek, Lakewood, CO (US); Brian P. Masloff, Golden, CO (US); John C. Fodor, Golden, CO (US)

(73) Assignee: Golder Associates, Inc., Lakewood, CO (US)

(*) Notice: Subject to any disclaimer, the term of this patent is extended or adjusted under 35 U.S.C. 154(b) by 164 days.

(21) Appl. No.: 13/211,074

(22) Filed: Aug. 16, 2011

(65) Prior Publication Data

US 2013/0045052 A1     Feb. 21, 2013

(51) Int. Cl.
| | | |
|---|---|---|
| B09C 1/00 | (2006.01) | |
| B09C 1/08 | (2006.01) | |
| B09C 1/02 | (2006.01) | |
| C09K 8/60 | (2006.01) | |
| C09K 8/94 | (2006.01) | |
| E21B 33/138 | (2006.01) | |
| E21F 15/00 | (2006.01) | |
| E21F 15/08 | (2006.01) | |

(52) U.S. Cl.
CPC ... *B09C 1/08* (2013.01); *B09C 1/02* (2013.01); *C09K 8/605* (2013.01); *C09K 8/94* (2013.01); *E21B 33/138* (2013.01); *E21F 15/005* (2013.01); *E21F 15/08* (2013.01)
USPC ........................................................ 405/129.2

(58) Field of Classification Search
USPC ......................................... 405/129.2, 129.25
See application file for complete search history.

(56) References Cited

U.S. PATENT DOCUMENTS

| | | | |
|---|---|---|---|
| 2,672,370 A | | 3/1954 | Jones et al. |
| 3,180,691 A | | 4/1965 | Wunsch et al. |
| 3,617,095 A | | 11/1971 | Lissant |
| 3,637,263 A | | 1/1972 | Wasp |
| 3,934,651 A | | 1/1976 | Nierode et al. |
| 3,937,283 A | | 2/1976 | Blauer et al. |
| 3,950,034 A | | 4/1976 | Dreher et al. |
| 3,979,217 A | | 9/1976 | Sutton |
| 4,080,419 A | * | 3/1978 | Engelmann ..................... 423/32 |
| 4,190,456 A | | 2/1980 | Absolon et al. |
| 4,200,413 A | | 4/1980 | Fitch |
| 4,419,135 A | | 12/1983 | Hoge |
| 4,464,200 A | | 8/1984 | Duval |

(Continued)

OTHER PUBLICATIONS

Advanced Remedial Methods for Metals and Radionuclides in Vadose Zone Environments—11026, Dawn M. Wellman et al., WM2011 Conference, Feb. 27-Mar. 3, 2011, Phoenix, AZ, pp. 1-9.

(Continued)

*Primary Examiner* — John Kreck
(74) *Attorney, Agent, or Firm* — Dority & Manning, P.A.

(57) ABSTRACT

A system for treating an excavation activity includes a distribution network in fluid communication with the excavation activity. A foaming agent and a reagent are supplied to the distribution network to form a reagent-foam mixture. The reagent is selected to react with at least one of sulfides, bacteria, or heavy metals or to coat particulate materials. A method for treating an excavation activity includes flowing a foam through a distribution network in fluid communication with the excavation activity and selecting a reagent to react with at least one of sulfides, bacteria, or heavy metals or to coat particulate materials. The method fluffier includes mixing the reagent with the foam flowing through the distribution network to form a reagent-foam mixture and dispersing the foam-reagent mixture over at least a portion of the excavation deposit.

18 Claims, 5 Drawing Sheets

(56) References Cited

U.S. PATENT DOCUMENTS

| | | | |
|---|---|---|---|
| 4,683,003 A | 7/1987 | Nakano et al. | |
| 4,721,526 A * | 1/1988 | Elmore et al. | 75/734 |
| 4,810,131 A * | 3/1989 | Turner | 405/129.5 |
| 4,869,905 A | 9/1989 | Sobek et al. | |
| 4,965,097 A | 10/1990 | Bach | |
| 5,026,735 A * | 6/1991 | Stern | 521/50 |
| 5,047,085 A | 9/1991 | Hihara et al. | |
| 5,063,967 A | 11/1991 | Stephens | |
| 5,080,534 A | 1/1992 | Goodson et al. | |
| 5,087,287 A | 2/1992 | Hihara et al. | |
| 5,091,014 A | 2/1992 | Hihara et al. | |
| 5,110,839 A | 5/1992 | Chao | |
| 5,183,505 A | 2/1993 | Spinney | |
| 5,336,474 A * | 8/1994 | Diehl et al. | 423/29 |
| 5,482,550 A | 1/1996 | Strait | |
| 5,494,514 A | 2/1996 | Goodson et al. | |
| 5,776,243 A | 7/1998 | Goodson et al. | |
| 6,099,615 A * | 8/2000 | Underwood | 75/772 |
| 6,210,955 B1 * | 4/2001 | Hayes | 435/262.5 |
| 6,297,295 B1 | 10/2001 | Gay et al. | |
| 6,586,497 B2 | 7/2003 | Gay et al. | |
| 6,994,491 B2 * | 2/2006 | Kittle | 405/129.95 |
| 7,153,541 B2 | 12/2006 | Elsetinow et al. | |
| 7,727,936 B2 | 6/2010 | Pauls et al. | |
| 7,906,463 B2 | 3/2011 | Starkey, II et al. | |
| 2003/0062162 A1 | 4/2003 | Middaugh et al. | |
| 2003/0209495 A1 | 11/2003 | Schlegel | |
| 2004/0197249 A1 * | 10/2004 | Wan et al. | 423/29 |
| 2004/0206499 A1 | 10/2004 | Nguyen et al. | |
| 2008/0196546 A1 * | 8/2008 | Seelmann-Eggebert et al. | 75/300 |
| 2008/0221379 A1 | 9/2008 | Barnes | |

OTHER PUBLICATIONS

Written Opinion and Search Report PCT/US2011/063632 dated Jul. 30, 2012.
Water Quality Improvements resulting from FBC ash grouting of buried piles of pyritic materials on a surface coal mine, Joseph Schueck,et al., paper presented 1996 Annual Meeting of the West Virginia acid mine Drainage Task Force, Morgantown, W. Va. , Apr. 2,3, 1996, pp. 1-17.
Remediation of acid mine drainage within strip mine spoil by sulfate reduction using waste organic matter, Jeralee Stalker, et al., paper presented at American Society for Surface Mining and Reclamation, Knoxville, Tennessee, May 1996 pp. 321-335.
Noah-Injection experiments for in-situ remediation of surface ace-mine spoil producing acid-mine drainage, Joseph Donovan, et al., article, Department of Geology and Geology, West Virginia University and National mine land reclamation center, West Virginia University http://wvndtaskforce.com/proceedings/97/97don/97don.htm, p. 1-2.
Source Treatment of Acid Mine Drainage at a Backfilled Coal Mine Using Remote Sensing and Biogeochemistry, Song Jin, et al., Water Air Soil Pollut (2008) Nov. 7, 2007, pp. 205-212.
Biological Source Treatment of Acid Mine Drainage Using Microbial and Substrate Amendments: Microcosm Studies, Song Jin, et al., Mine Water Environ, DOI 10:1007/s 10230-007-0026-0, Springer-Verlag , Oct. 23, 2007 pp. 1-11.
An Evaluation of Surfactant Foam Technology in Remediation of Contaminated Soil, ScienceDirect-Chemosphere vol. 57, Issue 9, Dec. 2004, pp. 1079-1089; http://www.sciencedirect.com/science/article/pii/S0045653504006964.
Abstract of article "The flow of foam through short porous media and apparent viscosity measurments", S. S. Marsden, Suhail A. Khan, Stanford U. Stanford, Calif., SPE Journal, vol. 6, No. 1, Mar. 1966, pp. 17-25.
Abstract of article "Microscopic behavior of foam in porous media", Mast, R.F., Illinois Geological Survey, Fall Meeting of the Society of Petroleum Engineers of AIME, Oct. 8-11, 1972, San Antonio, Texas.
Abstract of article "Some parameters influencing the formation and propagation of foams in porous media", Friedmann, F., Jensen, J.A., Chevron Oil Field Research Co., SPE California Regional Meeting, Apr. 2-4, 1986, Oakland California.
Abstract of article "Development of a Mechanistic foam simulator: The population Balance and Generation by snap-off", Falls, A.H., Hirasaki, G.J., Patzek, T.W., Gauglitz, D.A., Miller, D. D., and Ratulowski, T., of Shell Development Co., SPE Reservoir Engineering, vol. 3, No. 3, Aug. 1988, pp. 884-892.
Abstract of article "A laboratory Investigation of foam flow in sandstone at elevated pressure", Persoff, Peter , Lawerence Berkeley Laboratory; Radke, C.J., University of California; Pruess, Karsten, Benson, S.M. Lawerence Berkeley Laboratory; Witherspoon, P.A. U of California, SPE Reservoir Engineering, vol. 6, No. 3, Aug. 1991, pp. 365-372.
Abstract of article Change in apparent viscosity of CO2 foam with rock permeability, H.O. lee, J.P. Heller, and A.M.W. Hoefer, New Mexico Petroleum Research Center, SPE Reservoir Engineering, vol. 6, No. 4, Nov. 1991, pp. 421-428.
Abstract of article Influence of texture on steady foam flow in berea sandstone, Ettinger, R.A. , Radke, C.J. U. Of California, SPE Reservoir Engineering, vol. 7, No. 1, Feb. 1992, pp. 83-90.
Abstract of article Foam flow in Heterogeneous porous media:effect of cross flow, H.J. Bertin, :LETP-ENSAM; O.G. Apaydin, L.M. Castanier, A.R. Kovscek, Stanford U., SPE Journal, vol. 4, No. 2, Jun. 1999, pp. 75-82.
Abstract of article Experimental and Modeling Studies on foam in porous media: A review, Quoc P. Nguyen, Alexander V. Alexandrov, Pacelli L. Zitha, Peter K. Currie, Delft U of Technology, The Netherlands, SPE International Symposium of Formation Damage Control, Feb. 23-24, 2000, Lafayette, Louisiana.
Abstract of article Unified model for steady-state foam behavior at high and low foam qualities, J.M. Alvarez, U. of Texas at Austin,H.J. Rivas, PDVSA Intevep; W.R. Rossen, U. of Texas at Austin, SPE Journal, vol. 6, No. 3, Sep. 2001, pp. 325-333.
Abstract of article Formation fracturing with foam, Blauer, R.E. Kohlhaas, C.A., Colorado School of mines, Fall meeting of the Society of Petroleum Engineers of AIME, Oct. 6-9, 1974, Houston, Texas.
Abstract of article Extending foam technology from improved oil recovery to environmental remediation, C.K. Mamun, J.G. Rong, S.I. Kam, H.M. Liljestrand, W.R. Rosen, The University of Texas at Austin, SPE AnnualTechnical Conference and Exhibition, Sep. 29-Oct. 2, 2002, San Antonio, Texas.
Abstract of article Conditions for foam generation in homogeneous porous media, Dicksen Tanzil, George J. Hirasaki, Clarence A. Miller, Rice University, SPE/DOE Improved oil recovery symposium, Apr. 13-17, 2002, Tulsa, Oklahoma.
Abstract of article Mechanism of foam flow in porous media: Apparent viscosity in smooth capillaries, Hirasaki, G. J. Shell Development Co; Lawson J.B. Shell Development Co., SPE Journal, vol. 25, No. 2, Apr. 1985, pp. 176-190.
Abstract of article Foam propagation through soils for enhance in-situ remediation, P. Chowdiah, B.R. Misra, J.J. Kilbane II, V. J. Srivastava and T.D. Hayes, Journal of Hazardous Material, vol. 62, Issue 3, Oct. 16, 1998, pp. 265-280.
Abstract of article Surfactant concentration and end effects on foam flow in porous media, O.G. Apaydin and A. R. Kovscek, Earth and Environmental Science, Transport in Porous Media, vol. 43, No. 3, 511-536, DOI:10. 1023/A:1010740811277.

* cited by examiner

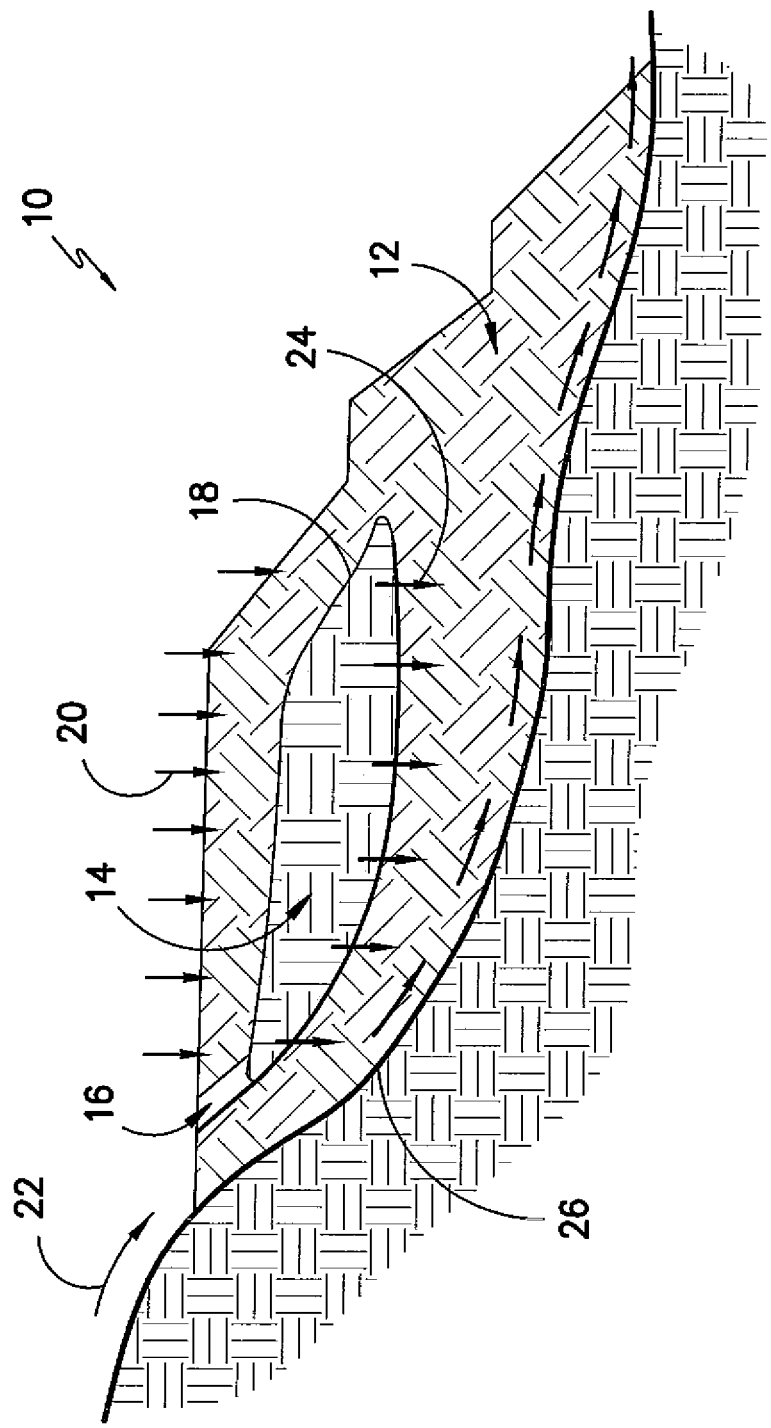
FIG. -1-

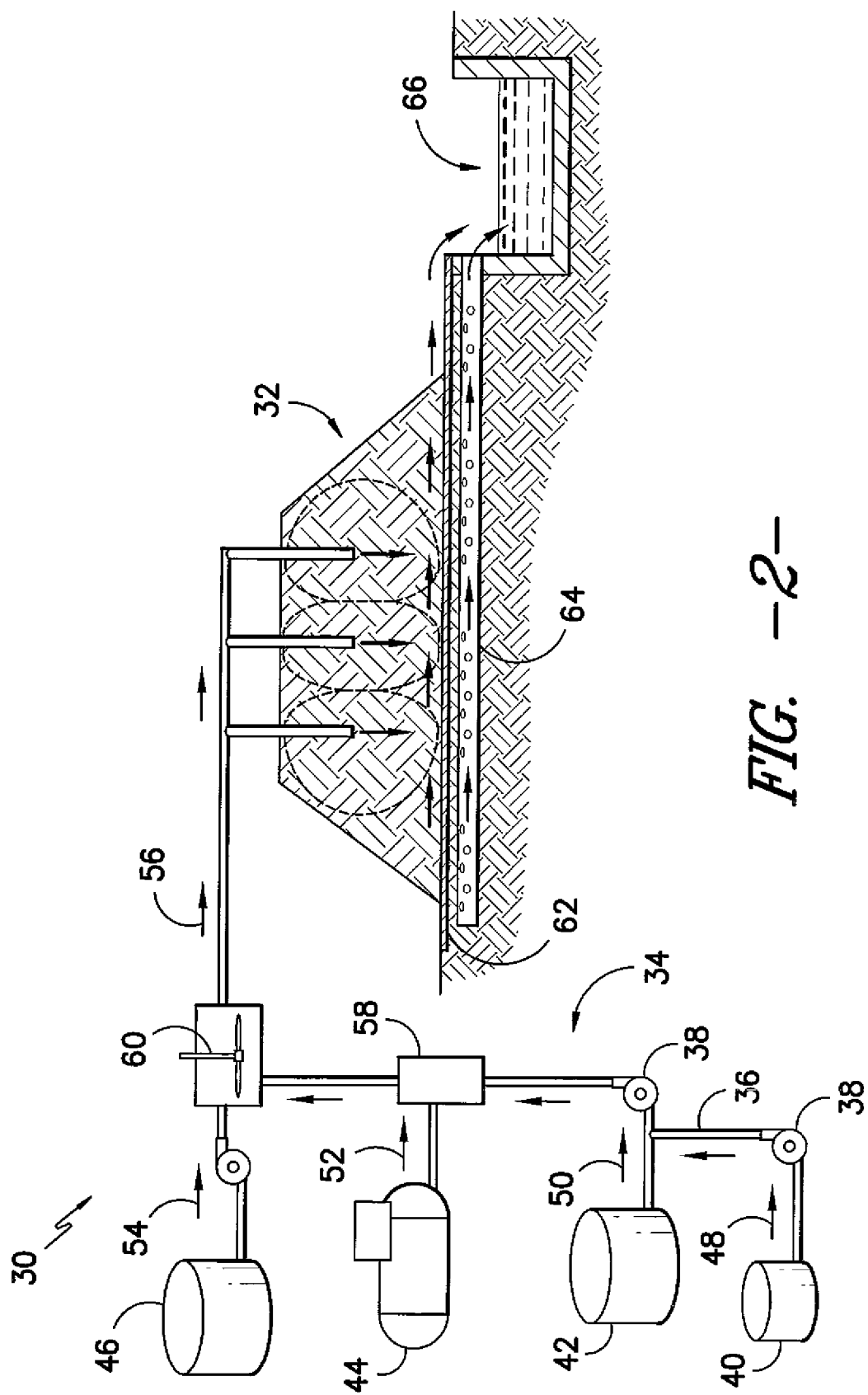
FIG. -2-

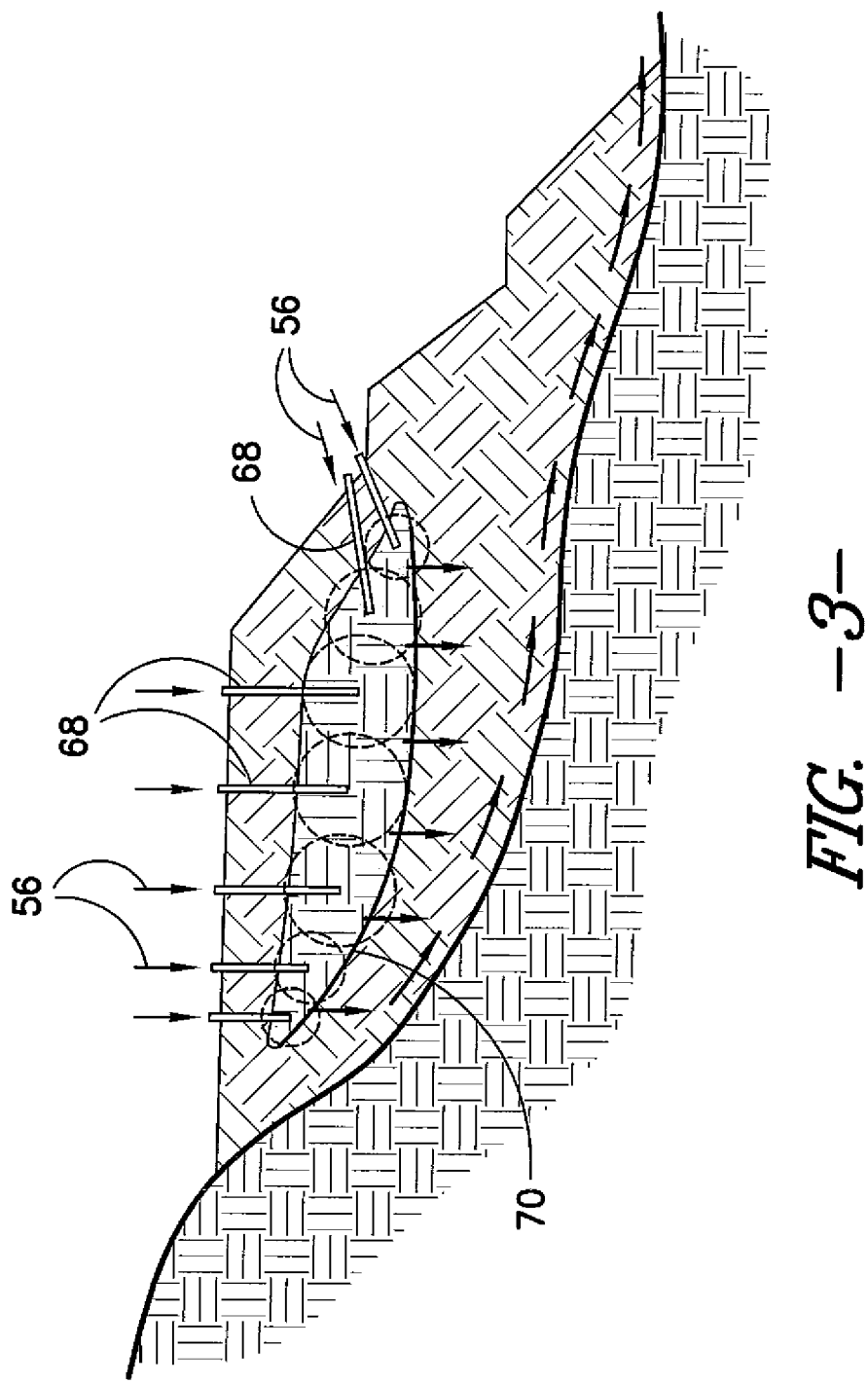
FIG. -3-

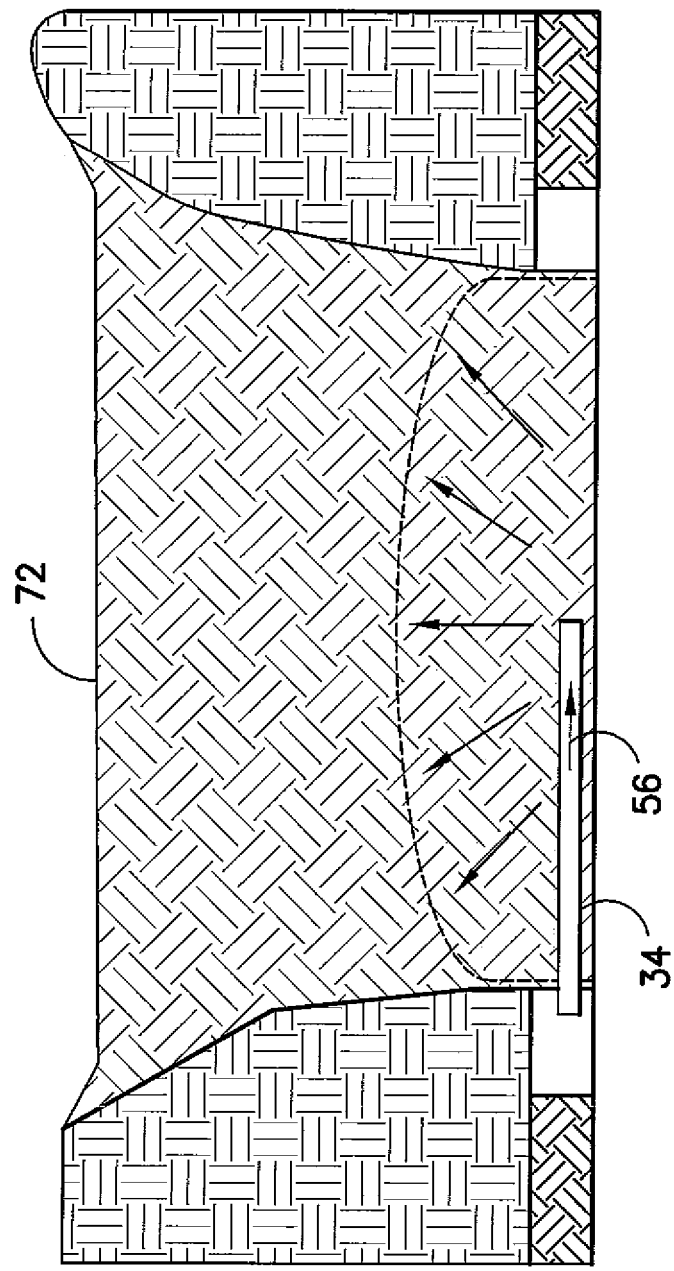
FIG. -4-

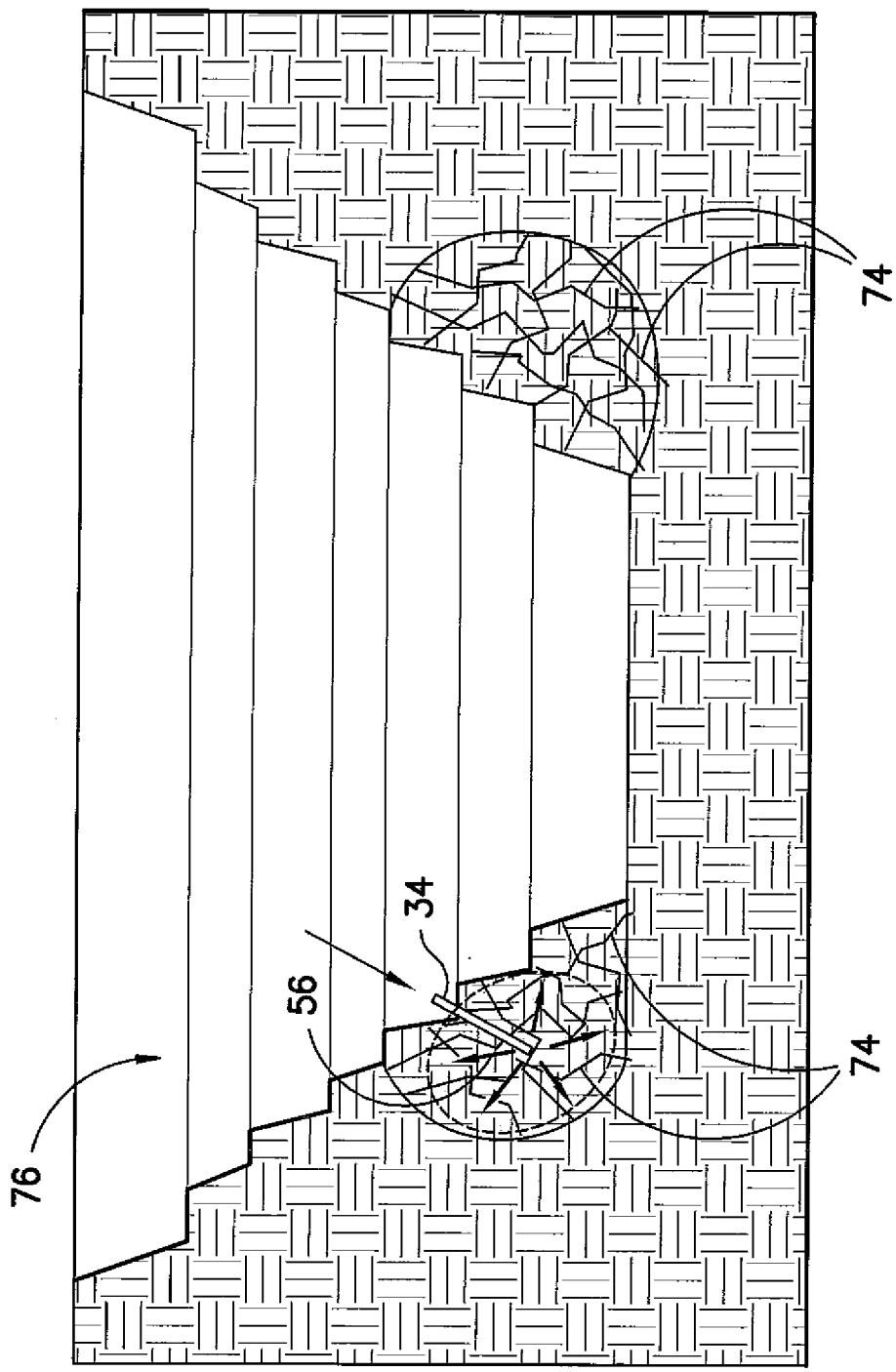

SYSTEM AND METHOD FOR TREATING AN EXCAVATION ACTIVITY

FIELD OF THE INVENTION

The present invention generally involves a system and method for treating an excavation activity. In particular embodiments of the present invention, the systems and methods may be used to treat byproducts and conditions associated with excavation activities to reduce acid rock drainage and/or recover valuable resources.

BACKGROUND OF THE INVENTION

Byproducts and conditions associated with excavation activities are known to lead to the generation of various forms of environmentally harmful pollution. As used herein, excavation activities encompass not only conventional mining operations to locate and recover natural resources below the surface of the earth, but also any other operations that disrupt large areas of the natural surface and/or contour of land. For example, highway construction and other large commercial developments often produce the same byproducts and conditions as conventional mining operations and constitute excavation activities within the scope of the present inventions.

FIG. 1 provides an exemplary drawing of an excavation activity 10 to illustrate various byproducts and conditions that may lead to the generation of various forms of environmentally harmful water pollution. The byproducts may include, for example, various forms of mineral processing waste, such as overburden 12, slag, gangue, and buried pyrite-bearing rock 14. The conditions may include, for example, the excavation site itself, draining adits, tunnels 16, abandoned pits 18, and mines. As shown in FIG. 1, rain water 20, runoff 22, and other sources of water may pass over and through various portions of the excavation activity 10 and interact and react with the byproducts and conditions to produce undesirable water pollution 24. The undesirable water pollution 24 generally gravity drains through the excavation activity 10 until it reaches an impermeable barrier, such as a natural or man-made liner 26, which eventually guides the water pollution to an outfall, such as a stream or underground well or ground water infiltration/recharge zone.

The water pollution 24 produced by excavation activities may be generically referred to as acid rock drainage (ARD) or acid mine drainage (AMD), and will hereinafter be collectively referred to as ARD. The combination of water, bacteria, and sulfide minerals exposed to air by excavation activities produces sulfuric acid, sulfates, iron and other metals in the ARD. For example, the following four generally-accepted chemical reactions describe the oxidation of sulfide minerals (represented by $FeS_2$ as a proxy for all reactive sulfide minerals) that produces ARD:

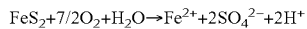
$$FeS_2 + 7/2 O_2 + H_2O \rightarrow Fe^{2+} + 2SO_4^{2-} + 2H^+ \qquad 1.$$

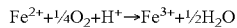
$$Fe^{2+} + \tfrac{1}{4}O_2 + H^+ \rightarrow Fe^{3+} + \tfrac{1}{2}H_2O \qquad 2.$$

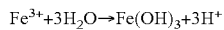
$$Fe^{3+} + 3H_2O \rightarrow Fe(OH)_3 + 3H^+ \qquad 3.$$

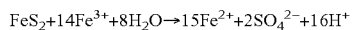
$$FeS_2 + 14Fe^{3+} + 8H_2O \rightarrow 15Fe^{2+} + 2SO_4^{2-} + 16H^+ \qquad 4.$$

As shown by the preceding equations, the elementary chemical ingredients required for the formation of ARD are air, water, and sulfide materials. As described below, bacteria can facilitate the formation of ARD. Once each elementary ingredient is present, the production of ARD may be predicted by a number of standard tests, including acid-base accounting tests, humidity cell tests, and column leach tests. For example, in a pH environment of less than approximately 4.5, naturally-occurring bacteria, such as acidithiobacillus ferro-oxidans and related microbes, may act as a catalyst and accelerate reactions 1, 2, and 4 above, lowering the pH even further. Hydrogen ions ($H^+$) and ferric iron ions ($Fe^{+3}$) may also accelerate the oxidation of other metal sulfides that may be present, releasing additional metals such as copper, lead, zinc, cadmium, mercury, and manganese into the ARD.

An effective method for reducing and/or preventing ARD is to remove and/or isolate one or more of the elementary ingredients—air, water, sulfide materials, and/or bacteria—required for ARD production. For example, a generally accepted system and method for treating byproducts and conditions associated with an excavation activity is to disperse one or more active ingredients or reagents over the excavation site to react with one or more of the elementary ingredients. As shown in FIG. 1, however, the byproducts and conditions associated with excavation activities are often buried, widely dispersed, and otherwise inaccessible to direct application of the active ingredients, requiring a combination of closely-spaced boreholes, gravity, and voluminous amounts of water to transport the active ingredients to the affected areas to be treated. Although effective at reducing or preventing ARD for the areas actually reached, the water-dispersed active ingredients often fail to reach all of the byproducts and conditions requiring treatment before passing through the excavation site. Therefore, an improved system and method for reliably dispersing active ingredients to treat excavation activities would be useful.

BRIEF DESCRIPTION OF THE INVENTION

Aspects and advantages of the invention are set forth below in the following description, or may be obvious from the description, or may be learned through practice of the invention.

One embodiment of the present invention is a system for treating an excavation activity. The system includes a distribution network in fluid communication with the excavation activity. A foaming agent is supplied to the distribution network, and a reagent is supplied to the distribution network to mix with the foaming agent to form a reagent-foam mixture. The reagent is selected to react with at least one of sulfides, bacteria, or heavy metals or to coat particulate materials.

Another embodiment of the present invention is a composition for treating an excavation activity. The composition includes a reagent suspended in foam to form a reagent-foam mixture. The reagent is selected to react with at least one of sulfides, bacteria, or heavy metals or to coat particulate materials.

The present invention may also include a method for treating an excavation activity. The method includes flowing a foam through a distribution network in fluid communication with the excavation activity and selecting a reagent to react with at least one of sulfides, bacteria, or heavy metals or to coat particulate materials. The method further includes mixing the reagent with the foam flowing through the distribution network to form a reagent-foam mixture and dispersing the foam-reagent mixture over at least a portion of the excavation deposit.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a simplified cross-section drawing of an exemplary excavation activity;

FIG. 2 is a simplified block diagram of a system for treating an excavation activity according to one embodiment of the present invention;

FIG. 3 is a simplified cross-section drawing of the excavation activity shown in FIG. 1 being treated according to one embodiment of the present invention;

FIG. 4 is a simplified cross-section drawing of an excavation deposit being treated according to an embodiment of the present invention; and FIG. 5 is a simplified cross-section drawing of an excavation pit being treated according to an embodiment of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a system and method for transporting and applying various gaseous, liquid, and/or solid active ingredients or reagents through natural or man-made porous and permeable media to treat an excavation activity to reduce and/or prevent water pollution, namely acid rock drainage (ARD), and/or facilitate valuable resource recovery. A stable foam slurry may be used to transport and apply the gaseous, liquid, and/or solid active ingredients or reagents. In particular embodiments, the system and method may be used at or with an excavation activity, including zones adjacent to the excavation activity and/or excavation deposits, to reduce and/or prevent the spread of ARD. Although described generally in the context of treating and/or preventing acid rock drainage associated with mining activities, one of ordinary skill in the art will appreciate that embodiments of the present invention may be readily adapted to treat virtually any excavation or mineral processing activity to reduce and/or prevent the spread of undesirable contamination.

FIG. 2 provides a simplified block diagram of a system 30 for treating an excavation activity 32 according to one embodiment of the present invention. As previously described, the excavation activity 32 may encompass byproducts and conditions associated with conventional mining operations as well as any other operations that disrupt large areas of the natural surface and/or contour of land. The byproducts and conditions may comprise porous and permeable materials, such as broken or fractured geological rock formations, ore, ore concentrates, coal, mine tailings, mine waste, slag, sand, or soil. Metallurgical processes, natural chemical changes such as oxidation, and/or biological activity may act on the porous and permeable materials to produce ARD, as previously described. Alternately, or in addition, the byproducts and conditions may contain valuable constituents, such as gold, silver, the platinum group metals, uranium, copper, lead, zinc, or any element that could economically be recovered from ore either found in place or excavated from the ground and subjected to conventional metallurgical processes for economic recovery.

As shown, the system 30 generally includes a distribution network 34 in fluid communication with the excavation activity 32. The distribution network 34 may be proximate to or remote from the excavation activity 32 and may comprise any suitable system for conveying or transporting a fluid to the excavation activity 32. For example, as shown in FIG. 2, the distribution network 34 may comprise a piping system 36 and one or more pumps 38 or blowers that provide fluid communication between one or more supply tanks and the excavation activity 32. The piping system 36 may connect, for example, one or more of a surfactant tank 40, a liquid reagent tank 42, a compressor 44, and/or a solid reagent tank 46 to the excavation activity 32. In this manner, the various tanks may supply one or more active ingredients or reagents to the excavation activity 32 to remove and/or isolate one or more of the elementary ingredients—air, water, sulfide materials, and/or bacteria—required for ARD production.

The surfactant tank 40 may supply a foaming agent 48 to the distribution network 34 to create a stable foam media for transporting or conveying one or more active ingredients or reagents to the excavation activity 32. As used herein, "foam" includes any two-phase fluid comprised of a liquid and a gas partitioned by a surfactant (e.g., soap) into bubbles. The foaming agent 48 may comprise, for example, sodium lauryl sulfate, ammonium lauryl sulfate, sodium laureth sulfate, natural surfactants derived from animal proteins, and/or combinations thereof. The actual foaming agent 48 and the active ingredients it carries will be customized for each application based on the objective of the application, the chemical makeup, physical condition, and microbiological suites present, and the degree of saturation of the polluting or resource-grade materials. It should be understood by one of ordinary skill in the art that various surfactants are contemplated within the scope of the present invention, and the present invention is not limited to any particular surfactant unless specifically recited in the claims.

The liquid reagent tank 42, compressor 44, and/or solid reagent tank 46 may supply one or more active ingredients or reagents to mix with the foaming agent 48, with the actual active ingredients or reagents selected to react with one or more of the elementary ingredients—air, water, sulfide materials, and/or bacteria—required for ARD production. For example, the liquid reagent tank 42, if present, may supply one or more liquid active ingredients or reagents 50 selected to react with one or more of the elementary ingredients. The liquid reagent tank 42 may supply a liquid bactericide selected to react with bacteria at the excavation activity 32 to reduce and/or prevent the production of ARD. Possible bactericides include, for example, sodium lauryl sulfate, waste milk or other dairy by-products, bi-polar lipids, and/or sodium thiocyanate. Alternately or in addition, the liquid reagent tank 42 may supply solutions, such as sodium hydroxide and/or hydrated lime solutions, selected to adjust the pH at the excavation activity 32. In still further embodiments, the liquid reagent tank 42 may supply solutions, such as sodium cyanide, thiourea, sodium hypochlorite, and/or hydrogen peroxide, selected to dissolve or leach precious metals from the excavation activity 32. By way of further example, the liquid reagent tank 42 may supply solutions selected to coat the excavation activity 32 and isolate the excavation minerals from air and/or water. For example, a solution of dissolved potassium permanganate has been shown to coat particulate mine waste materials with a layer of manganese dioxide and thus isolate pyrite-bearing rocks from air and water to prevent the production of ARD. Similarly, solutions of dissolved phosphate have been shown to complex with dissolved iron and starve bio-oxidation of pyrite through disruption of the kinetics of equations 2, 3, and 4 previously discussed.

The compressor 44, if present, may similarly supply one or more gaseous active ingredients or reagents 52 selected to react with one or more of the elementary ingredients. For example, the compressor 44 may supply carbon dioxide, nitrogen, or other inert gases that can displace oxygen proximate to the byproducts and conditions associated with the excavation activity 32, thereby interfering with or preventing one or more of the chemical reactions known to produce ARD. Alternately or in addition, the compressor 44 may supply hydrogen sulfide which, in addition to displacing oxygen, may also immobilize heavy metals present in solution at the excavation activity 32.

The solid reagent tank 46, if present, may similarly supply one or more solid active ingredients or reagents 54 selected to react with one or more of the elementary ingredients. For example, limestone, dolomite, cement kiln dust, steel slag, sodium bicarbonate, fly ash, and various pozzolanic materials may provide acid-neutralizing alkalinity to sulfide-bearing rock materials prone to produce ARD. Alternately, or in addition, slow-release bactericides may be used to suppress pyrite oxidizing bacteria, and/or organic materials, such as cellulose, wood, and paper, bio-solids, and/or animal and vegetable proteins may be used to suppress pyrite oxidation. Processed peat, natural peat, zeolite minerals, manganese oxides, and similar man-made products such as resins may be added to adsorb heavy metals. Additional solid active ingredients or reagents within the scope of the present invention may include zero valent iron, nano-scale iron, powdered iron oxy-hydroxides, and powdered copper which have the ability to chemically alter or detoxify dissolved pollutants.

As shown in FIG. 2, the various liquid, gaseous, and/or solid active ingredients or reagents 50, 52, 54 are mixed or added to the foaming agent 48 to form a reagent-foam composition or mixture 56. For example, a foam tube 58 and/or a mixer 60 may be included in the distribution network 34, as needed, to homogeneously mix or prepare the reagent-foam mixture 56. The actual active ingredient or reagent mixed with the foaming agent 48 will depend on the actual conditions at the excavation activity 32. For example, Table I below identifies various active ingredients or reagents that may be selected to react with one or more of the elementary ingredients—air, water, sulfide materials, and/or bacteria—required for ARD production:

TABLE I

| Elementary Ingredient | Reagent | Anticipated Reaction |
|---|---|---|
| Air | Fresh or composted wood chips, sawdust, or cellulose Mushroom compost Animal & vegetable protein Bio-solids Paper products | Consumes oxygen by organic decay |
| | Nitrogen Carbon Dioxide | Displaces air/oxygen |

TABLE I-continued

| Elementary Ingredient | Reagent | Anticipated Reaction |
|---|---|---|
| | Hydrogen Sulfide | Displaces air & forms metal sulfides |
| Water | Potassium permanganate solutions Keeco Mix (micro-silicate encapsulation material) Paint (latex or oil-based) or other water-resistant coating material | Coats reactive surfaces to render them impermeable |
| Sulfides | Limestone Dolomite Kiln dust Sodium bicarbonate Fly ash Flue gas desulfurization Coal combustion by-products Pozzolanic materials (cement) Steel slag Lime solution Sodium hydroxide solution Ammonia solution | Neutralize acidity |
| Bacteria | Sodium lauryl sulfate solution Sodium lauryl sulfate Milk Bi-polar lipids Phosphate solution Sodium thiocyanate solution | Bactericide |
| | Composted animal manure Municipal sewage bio-solids Natural soils from wetlands Keeco Mix (micro-silicate encapsulation material) | Inoculate polluting materials with beneficial bacteria |

Alternately, or in addition, Table II below identifies various active ingredients or reagents that may be selected to react with one or more heavy metals or other pollutants to facilitate recovery, detoxification, and or immobilization:

TABLE II

| Pollutant | Reagent | Anticipated Reaction |
|---|---|---|
| Heavy Metals (e.g., Cd, Hg, Pb) or Base Metals (e.g., Cu, Zn, Fe) | Zero Valent Iron Nano-scale iron Iron oxy-hydroxide powder Copper powder Manganese oxide minerals Peat (processed & natural) Zeolite minerals Organic resins Activated carbon | Adsorb dissolved metals to the reagent |
| Dissolved and/or volatile organic compounds | Zero Valent Iron Nano-scale iron | Convert toxic dissolved organic carbon compounds to harmless compounds |
| Sodium cyanide leach solutions in gold mining | Bleach (sodium hypochlorite solution) Hydrogen peroxide solution Sulfur dioxide | Detoxify cyanide |
| Sodium cyanide leach solution | Sodium cyanide | Leach gold or silver from ore |
| Buffered carbonate solution | Sodium bicarbonate | Leach uranium from ore |
| Thiourea leach solution | $H_2NCSNH_2$, an organic compound soluble in water | Leach gold or silver from ore |
| Sulfuric acid leach solution | $H_2SO_4$ | Leach copper or uranium from ore |

As shown in FIG. 2, the reagent-foam composition or mixture 56 may be dispersed over the excavation activity 32 using standard grouting technology such as packers, specialized grout casing, or foam-retaining bulkheads for large underground mine voids, as desired. At the point of introduction, the reagent-foam mixture 56 expands omni-directionally (upward, downward, and circumferentially) as an advancing front that coats and saturates the porous and permeable materials present at the excavation activity 32. The grout tubing or packers may be repositioned as needed to allow the injection point(s) to be varied to disperse the reagent-foam mixture 56 in the desired zone.

Preliminary tests have shown that the foaming agent 48 effectively penetrates porous and permeable materials commonly found at excavation activities 32, leaving a coating on the materials when the foam dissipates. For example, the exothermic reactions associated with the oxidation of sulfides frequently results in warm, dry zones that will quickly dissipate the moisture from the foam, precipitating a higher concentration of active ingredients or reagents at that particular location that suppress additional chemical or bacterial oxidation. In addition, the precipitated active ingredients or reagents do not obstruct or otherwise clog the porous and permeable materials, allowing for subsequent applications over time without a loss of effectiveness. As a result, multiple reagents may be applied in sequence, if desired, using the same injection point or distribution network 34. These and other benefits indicate that the foaming agent 48 provides superior transport and deposition characteristics compared to conventional liquid dispersal techniques, while requiring substantially less water.

As further shown in FIG. 2, the system 30 may further include a liner 62 and/or a collection network 64 in fluid communication with the excavation activity 32. The liner 62 may comprise a natural or man-made surface beneath at least a portion of the excavation activity 32 that provides a barrier for any water draining from the excavation activity 32. Alternately, or in addition, the collection network 64 may comprise perforated drainage pipes that collect and channel water draining from the excavation activity 32 to a collection point 66 for additional processing and disposal.

FIGS. 3-5 provide simplified drawings of various excavation activities being treated according to embodiments of the present invention. For example, FIG. 3 shows the use of multiple injection ports 68 to distribute and disperse the reagent-foam mixture 56 into a buried excavation deposit 70. The omni-directional expansion of the reagent-foam mixture 56 through the excavation deposit 70 allows for complete coverage of the excavation deposit 70 using fewer injection ports 68, with a corresponding reduction in water consumption. As shown in FIG. 4, the omni-directional expansion of the reagent-foam mixture 56 allows the system 30 to treat a surface excavation deposit 72 from the bottom. Expansion of the injected reagent-foam mixture 56 beneath the excavation deposit 72 causes upward dispersal and distribution of the selected active ingredients or reagents. Finally, FIG. 5 shows use of the system 30 to economically treat localized or isolated excavation activities such as fractures 74 or other shallow geological disturbances in an excavation pit 76. As shown, the distribution network 34 may facilitate precise application of the reagent-foam mixture 56, thereby reducing the consumption of water and active ingredients in the process.

One of ordinary skill in the art can readily determine with minimal experimentation preferred combinations and ratios of the various foaming agents and active ingredients or reagents depending on the particular excavation activity. Based on the enhanced distribution and dispersal characteristics of the foaming agent 48 compared to conventional distribution and dispersal methods, it is anticipated that the fractional percentage of active ingredients or reagents in the reagent-foam mixture will be substantially less than needed in conventional methods. For example, it is anticipated that the active ingredients or reagents, particularly the solid active ingredients or reagents, will comprise less than 10%, and in some embodiments less than 5%, 2%, or 1%, by volume of the reagent-foam mixture, resulting in substantial savings. Nonetheless, the following hypothetical examples are provided for illustration and not limitation of the present invention.

Example 1

An excavation activity comprises a twenty acre excavation deposit containing a pollution generating pyrite-bearing rock zone that has been delineated through borehole and geophysical data. The excavation deposit has a total volume of approximately 3.2 million cubic yards, of which approximately one-third or 1.1 million cubic yards is void space. Approximately 25% of the excavation deposit volume (i.e., approximately 806,000 cubic yards) contains the pollution generating pyrite-bearing rock, with approximately 266,000 cubic yards of voids in this pollution-generating zone.

The designed distribution network includes a commercial air compressor with a capacity of 100 cubic feet per minute and a standard pressure of 100 pounds per square inch, a pump with a capacity from 5 to 20 gallons per minute, tanks, and other conventional foam-generating equipment connected generally as shown in FIG. 2. The designed piping system includes 4-inch diameter pipe installed in a plurality of boreholes drilled into the approximate geometric centroids of the pyrite-bearing rock zones. The annulus between the pipe and the surrounding pyrite-bearing rock zones is filled with sand or concrete.

The active ingredients or reagents for this application are selected to provide an anti-bacterial action, acidic pH neutralizing actions, and oxygen depletion actions. The selected anti-bacterial reagents include sodium lauryl sulfate (which is also the foaming agent); waste milk (nutrient for beneficial bacteria to out-compete pyrite-oxidizing bacteria); and bio-solids (bacterial inoculum). The selected acidic pH neutralizing reagent is finely crushed limestone powder having a grain size from approximately 20 mesh (0.84 mm) to approximately 200 mesh (0.074 mm). The selected oxygen-depleting reagent is a fine-grained sawdust waste product having a nominal diameter of approximately 20 mesh (0.84 mm). Hypothetical laboratory testing and/or field trials indicate the following ratios of the foaming agent and active ingredients or reagents produce the desired reagent-foam mixture:

| Component | Volume in 1 cubic yard of mixture | Percent by Volume |
| --- | --- | --- |
| Water | 3.20 cubic feet | 11.9% |
| Waste milk | 0.17 cubic feet | 0.6% |
| Bio-solids | 0.15 cubic feet | 0.6% |
| Crushed limestone | 0.80 cubic feet | 3.0% |
| Sawdust | 0.05 cubic feet | 0.2% |
| Surfactant (SLS) | 0.21 cubic feet | 0.8% |
| Gas (air) | 22.42 cubic feet | 83.0% |
| Totals | 27.0 cubic feet | 100% |

The resulting reagent-foam mixture contains about 3.85% solids by volume or about 10,238 cubic yards of solid active ingredients for the entire treatment outlined in this example.

Example No. 2

An excavation activity comprises a 200 acre abandoned open pit mine site that exposes a fractured, pyrite-bearing rock zone that has been delineated through borehole, geochemical data, and geologic interpretation. The fracture zone is a combination of natural geological conditions and over-break from blasting activity in creating the excavation. The zone of intense fracturing extends at least 100 feet into the excavation wall rock and through the floor of each bench, as shown in FIG. 5. The fractures constitute less than 1% of the total rock mass volume. Every linear foot of excavation bench includes an estimated 150 cubic yards of rock, of which 1.5 cubic yards are void space. There are 2 miles of bench in the pyrite-rock exposure, resulting in 15,840 cubic yards of fracture that requires treatment in this pollution-generating zone.

The designed distribution network includes a commercial air compressor with a capacity of 100 cubic feet per minute and a standard pressure of 100 pounds per square inch, a pump with a capacity from 5 to 20 gallons per minute, tanks, and other conventional foam-generating equipment connected generally as shown in FIG. 2. The designed piping system includes 2-inch diameter pipe installed in a plurality of boreholes drilled into the pyrite-bearing fractured rock zones. The annulus between the pipe and the surrounding pyrite-bearing rock zones is filled with cementitious grout to seal the pipe into the rock mass.

The active ingredients or reagents for this application are selected to provide an anti-bacterial action and acidic pH neutralizing actions. The anti-bacterial ingredients include sodium lauryl sulfate (which is also the foaming agent); waste milk (nutrient for beneficial bacteria to out-compete the pyrite oxidizing bacteria); and bio-solids (bacterial inoculum). The selected acidic pH neutralizing reagent is finely crushed limestone powder having a grain size from approximately 200 mesh (0.074 mm) to approximately 400 mesh (0.037 mm) and a solution of sodium hydroxide having a pH of 12.0. This reagent-foam mixture was selected to allow the placement of particulate limestone in larger fractures and the injection of liquid active ingredients in zones of small fractures. The sodium hydroxide provides immediate pH reduction, and the limestone provides long-term pH control. Hypothetical laboratory testing and/or field trials indicate the following ratios of the foaming agent and active ingredients or reagents produce the desired reagent-foam mixture:

| Component | Volume in 1 cubic yard of mixture | Percent by Volume |
| --- | --- | --- |
| Water | 2.53 cubic feet | 9.4% |
| Waste milk | 0.84 cubic feet | 3.1% |
| Bio-solids | 0.0125 cubic feet | 0.05% |
| Crushed limestone | 0.24 cubic feet | 0.9% |
| Sodium Hydroxide | 0.0125 cubic feet | 0.05% |
| Surfactant (SLS) | 0.21 cubic feet | 0.8% |
| Gas (air) | 23.17 cubic feet | 85.8% |
| Totals | 27.0 cubic feet | 100% |

The resulting reagent-foam mixture contains about 0.93% solids by volume or about 3,640 cubic yards of solid active ingredients for the entire treatment outlined in this example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for treating materials produced from an excavation activity, comprising:
    a. a collection of at least one of waste rock or tailings materials;
    b. a distribution network in fluid communication with said collection of at least one of waste rock or tailings materials;
    c. a foaming agent supplied through said distribution network to said collection of at least one of waste rock or tailings materials;
    d. a reagent supplied through said distribution network to mix with said foaming agent to form a reagent-foam mixture, wherein said reagent is selected to react with at least one of sulfides or bacteria in said collection of at least one of waste rock or tailings materials to reduce acid rock drainage from said collection of at least one of waste rock or tailings materials; and
    e. wherein said reagent comprises at least one of limestone, dolomite, sodium bicarbonate, steel slag, fly ash, or sodium hydroxide.

2. The system as in claim 1, wherein said distribution network comprises a piping system and at least one pump in fluid communication with said piping system.

3. The system as in claim 1, wherein said foaming agent comprises at least one of sodium lauryl sulfate, ammonium lauryl sulfate, sodium laureth sulfate, or natural surfactants derived from animal proteins.

4. The system as is claim 1, wherein said reagent-foam mixture comprises less than approximately 10 percent by volume of reagent.

5. The system as in claim 1, wherein said reagent comprises carbon dioxide or an inert gas that displaces oxygen.

6. The system as in claim 1, wherein said reagent comprises at least one of milk, sodium thiocyanate, bio-solids, sawdust, paper, or composted animal manure.

7. The system as in claim 1, wherein said reagent comprises at least one of iron, copper, manganese oxide, zeolite minerals, peat, activated carbon, or organic resins.

8. The system as in claim 1, further comprising a collection network in fluid communication with said collection of at least one of waste rock or tailings materials.

9. The system as in claim 1, further comprising a liner below at least a portion of said collection of at least one of waste rock or tailings materials.

10. A method for treating materials produced from an excavation activity, comprising:
    a. flowing a foam through a distribution network in fluid communication with a collection of at least one of waste rock or tailings materials;
    b. selecting a reagent to react with at least one of sulfides or bacteria in said collection of at least one of waste rock or tailings materials to reduce acid rock drainage from said collection of at least one of waste rock or tailings materials, wherein said reagent comprises at least one of iron, copper, manganese oxide, zeolite minerals, peat, activated carbon, or organic resins;
    c. mixing said reagent with said foam flowing through said distribution network to form a reagent-foam mixture; and
    d. dispersing said foam-reagent mixture over at least a portion of said collection of at least one of waste rock or tailings materials.

11. The method as in claim 10, further comprising mixing less than approximately 10 percent by volume of said reagent in said reagent-foam mixture.

12. The method as in claim 10, further comprising extracting heavy metals from said collection of at least one of waste rock or tailings materials.

13. The method as in claim 10, further comprising collecting a runoff of fluid below said collection of at least one of waste rock or tailings materials.

14. A system for treating materials produced from an excavation activity, comprising:
  a. a collection of at least one of waste rock, heap leach, or tailings materials;
  b. a distribution network in fluid communication with said collection of at least one of waste rock or tailings materials;
  c. a foaming agent supplied through said distribution network to said collection of at least one of waste rock or tailings materials;
  d. a reagent supplied through said distribution network to mix with said foaming agent to form a reagent-foam mixture, wherein said reagent is selected to react with said collection of at least one of waste rock or tailings materials to reduce acid rock drainage from said collection of at least one of waste rock or tailings materials; and
  e. wherein said reagent comprises at least one of milk, sodium thiocyanate, sawdust, paper, or composted animal manure.

15. The system as in claim 14, wherein said reagent comprises carbon dioxide or an inert gas that displaces oxygen.

16. The system as in claim 14, wherein said reagent comprises at least one of limestone, dolomite, sodium bicarbonate, steel slag, fly ash, or sodium hydroxide.

17. The system as in claim 14, wherein said reagent comprises at least one of copper, manganese oxide, zeolite minerals peat, activated carbon, or organic resins.

18. The system as in claim 14, further comprising a collection network in fluid communication with said collection of at least one of waste rock or tailings materials.

\* \* \* \* \*